United States Patent [19]

Weissenbach

[11] 4,131,141
[45] Dec. 26, 1978

[54] CONTAINED VOLATILE LIQUIDS VAPOR RETENTION SYSTEM

[76] Inventor: Joseph Weissenbach, 373 S. Hoover St., Los Angeles, Calif. 90020

[21] Appl. No.: 701,654

[22] Filed: Jul. 1, 1976

Related U.S. Application Data

[63] Continuation-in-part of Ser. No. 387,958, Aug. 13, 1973, Pat. No. 3,977,379.

[51] Int. Cl.² .............................................. B65B 3/18
[52] U.S. Cl. .................................... 141/285; 141/292; 141/311 R
[58] Field of Search .................. 141/52, 59, 93, 97, 141/192, 287, 290, 291, 292, 351, 352, 360–362, 392, 311 R

[56] References Cited

U.S. PATENT DOCUMENTS

| | | | |
|---|---|---|---|
| 2,545,820 | 3/1951 | Lehr | 141/352 X |
| 3,581,782 | 6/1971 | Onufer | 141/59 |
| 3,830,267 | 8/1974 | Cass | 141/290 |

Primary Examiner—Richard E. Aegerter
Assistant Examiner—Frederick R. Schmidt

[57] ABSTRACT

A combustion engine system has a tank for volatile fuel with a flexible bag inside equipped with its own breather valve separate form the fill pipe for the tank. When the tank is filled, a muff around the full pipe seals the tank against exhaust of volatile vapors, and air from the bag is forced out the breather valve as it is displaced by the liquid fuel until a valve element on the bag shuts off the breather valve, whereby only pure air is vented to the atmosphere. As the tank empties during use, air returns through the breather valve to fill the bag and replace the space in the tank previously occupied by the liquid fuel, and incoming air may be dried. There is a vapor return for the automatic nozzle used to fill the tank with fuel from a stationary reservoir at the filling station and automatic means to prevent filling the tank until the nozzle is sealed in the fill pipe.

8 Claims, 26 Drawing Figures

CONTAINED VOLATILE LIQUIDS VAPOR RETENTION SYSTEM

SPECIFICATION

This is a continuation-in-part of copending application Ser. No. 387,958, filed Aug. 13, 1973 now U.S. Pat. No. 3,977,359.

There is in the prior art an assortment of structures showing one flexible container or another housed within a tank of some kind directed to the solution of various problems. Reference is made to prior patents in this general field of activity, namely:

| | |
|---|---|
| 1,977,862 Scholtes | 2,611,512 Fashay |
| 2,111,839 Chenicek | 2,758,747 Stevens |
| 2,387,598 Mercier | 2,798,639 Urban |
| 2,542,929 Kimball | 3,477,610 Hansen |
| 3,617,034 Skinner | 3,678,912 Hensler |
| | 3,752,355 Weissenbach |

Sundry deficiencies are present in the patents identified above which makes them unsuitable for eliminating objectionable gases resulting from filling and emptying storage tanks for such materials as volatile liquids and explosive vapors and not acceptable for use in a vapor return system.

Some of the prior structures undertake to use the interior flexible bag as a container for the fluid to be stored. This expedient has serious defects, among them being excessive wear of the flexible container when such a flexible container is shifted about partially full. Others of the prior patents show somewhat complex structures unsuited, by reasons both of performance and cost, to use on a conventional tank for the well-known combustion engine.

For preventing hot-soak evaporative emissions from exposure to and pollution of the atmosphere when the engine is shut off and latent heat therefrom is causing vaporization of the fuel in the carburetor itself, a power controlled butterfly, throttle, or other suitable valve located upstream of the aforementioned tube is biased to closed position thereby causing the hot-soak vapors to enter said tube and be conducted through it back to the fuel tank where cooler liquid will absorb said vapors by condensation or affinity. In the event that equilibrium already exists, the vapors will temporarily displace a proportional volume of air from the flexible bag until such time as the engine is again started and the pressure drop so occasioned will purge the tank of all existing vapors. The valve may be controlled by other suitable means such as a pendalum or spring.

There is presently available in the art pertaining to suppression of diurnal breathing evaporative emission losses, running evaporative emission losses, and hot-soak evaporative emission losses, a number of both dependent and independent control devices in sundry combinations. The vast majority of these devices depend upon conducting such vapors in one manner or another to an activated charcoal container where, theoretically at least, they are supposed to be absorbed by said activated charcoal and then, ultimately, purged from the charcoal by the running engine. Such expedients are actually defective. For example, hot-soak vapors when generated thermally by latent heats in the engine compartment and exhaust manifold, temperature of fuel in the carburetor is often as high as 300° F. Heavy ends therefrom will remain in the activated charcoal until considerably higher temperatures are applied during the purging cycle. Many such hot-soak cycles eventually render the container saturated.

When the fuel tank is filled to capacity with cool fuel, usually from subterranean storage, and the vehicle is driven a short distance to a parking lot where it resides in the sun all day the fuel is subject to thermal expansion. Liquid then completely fills the charcoal container. The container is then rendered ineffective for an indefinite period of time and never regains full effectiveness until the charcoal is reactivated.

In the matter of diurnal breathing losses, thermal and kinetic vaporization introduces appreciable heavy end vapor constituents into the activated charcoal which normal vehicle operation cannot purge.

Running losses from the fuel tank exist under the same situation when diurnal breathing losses are encountered plus the added factor of motion-induced splashing.

It is therefore among the objects of this invention to provide a new and improved means of inexpensively retrofitting all motor vehicles other than closed-system gaseous fueled units with a simple and positive means of precluding exposure of fuel or its vapors to the surrounding atmosphere.

Another object of the invention is to provide a new and improved means for the self-accommodation of noxious and photochemically reactive vapors heretofore emitted by motor vehicles.

Still another object of the invention is to provide a simple and relatively inexpensive means for self-accommodation of noxious and photochemically reactive vapors rather than to attempt neutralization of such vapors by means of costly reactivation or replacement of neutralizing agents.

Further among the objects of the invention is to provide a new and economical means for conserving the fuel energy in vapor form which heretofor in the process of ineffectual neutralization has been lost to the consumer.

Still further among the objects of the invention is to provide a new, simple and inexpensive means of substantially eliminating diurnal breathing losses from the fuel tank and other parts of the fuel system when the fuel tank is subjected to a temperature increase representative of the diurnal range and to effectively return all displaced raw hydrocarbons to the stationary reservoir.

Still another object of the invention is to provide a new and effective means of substantially eliminating running evaporative emissions from the fuel tank and carburetor.

It is further and an important object of this invention to provide an entirely new, positive, relatively inexpensive interrelated, and energy-conserving system whereby the known volumes and tonnages of noxious and wasteful hydrocarbon emissions from evaporative, spillage, outage, and fuel transfer losses can be reduced to such a point as to render hydrocarbon evaporative emissions virtually unnoticeable.

With these and other objects in view, the invention consists of the construction, arrangement, and combination of the various parts of the device, whereby the objects contemplated are attained, as hereinafter set forth, pointed out in the appended claims and illustrated in the accompanying drawings.

In the drawings:

also be mounted on a pair of lens mounts and locked thereto by means of locking means to lock the nosepiece rigidly in a predetermined position with the elongated slot and the locking means allowing the nosepiece to be vertically and angularly adjusted to fit the bridge of the user's nose.

Accordingly it is an object of the invention to provide a new and novel device for use in an ophthalmic device which allows the user to alleviate the problems encountered in the proper fitting of prior type eyeglass frames.

Another object of the invention is to provide a new and novel removable one-piece preformed detachable nosepiece which is designed to permit vertical and angular adjustment of the nosepiece to fit the bridge of the user's nose when used with an eyeglass frame.

Still yet another object of the invention is to provide an ophthalmic device which has a removable one-piece preformed detachable nosepiece which may be adjusted front-to-rear and vertically and which may be readjusted relatively quickly by the optometrist and then locked in place by a locking device.

Yet another object of the invention is to provide a new and novel detachable nosepiece and ophthalmic device using the nosepiece which allows the user of the eyeglass frame to be more fully satisfied with the accompanying fit and which relieves heretofore known pressures on the nose bridge of the user.

Still yet another object of the invention is to provide a new and novel ophthalmic frame and detachable nosepiece which has provided thereon a non-slip, soft, porous spongy-like coating applied thereto to aid in preventing the nosepiece from slipping on the bridge of the user's nose.

These and other objects and advantages of the invention will become apparent from a study of drawings attached herewith and from a reading of the description of the preferred embodiment to be described more fully hereinafter.

BRIEF DESCRIPTION OF THE DRAWINGS

Figure 1:
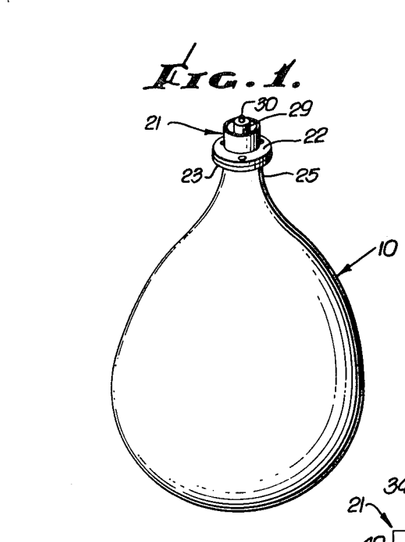
Figure 2:
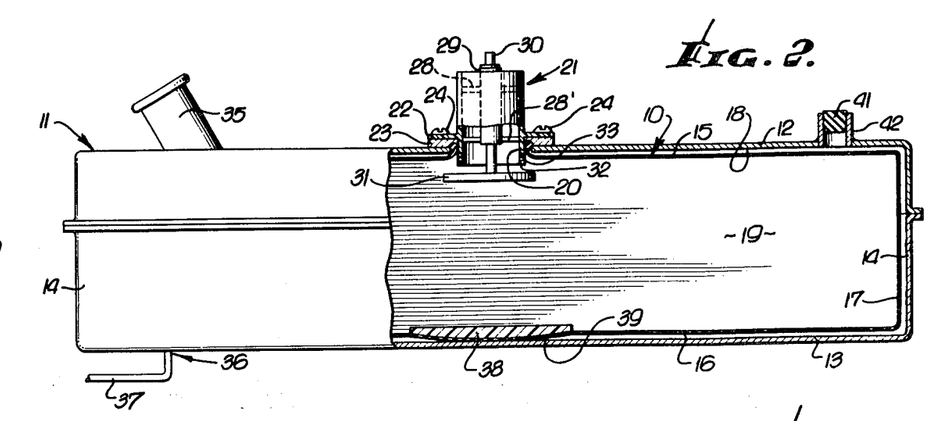
Figure 3:
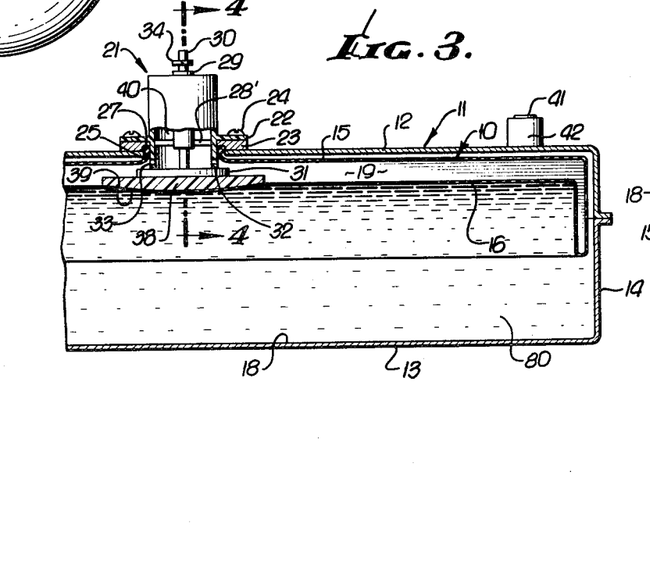
Figure 4:
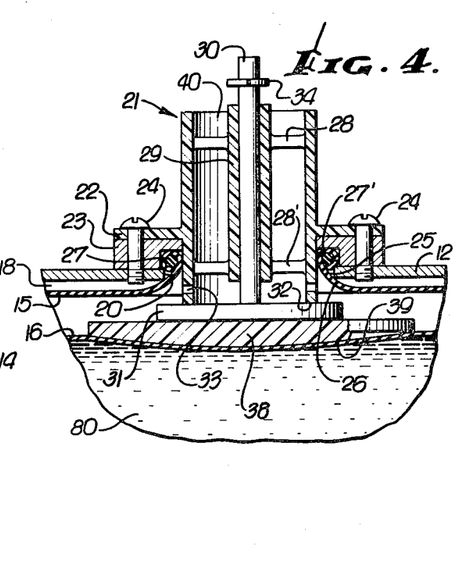
Figure 5:
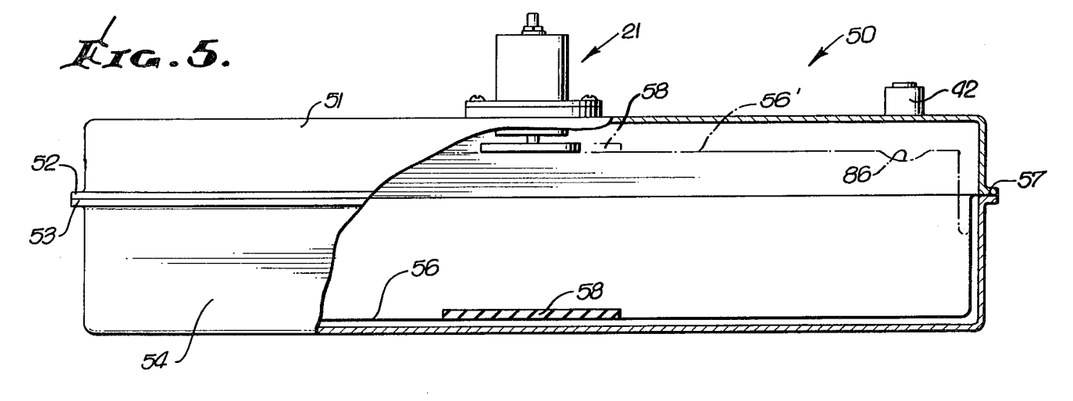
Figure 6:
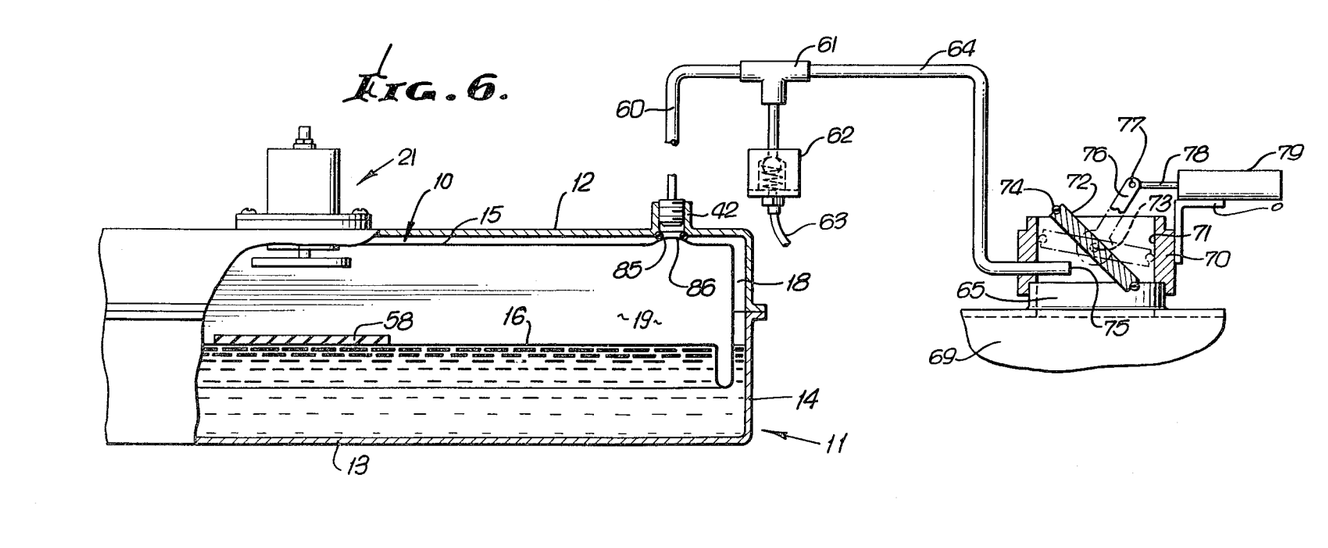
Figures 7, 8, 10:
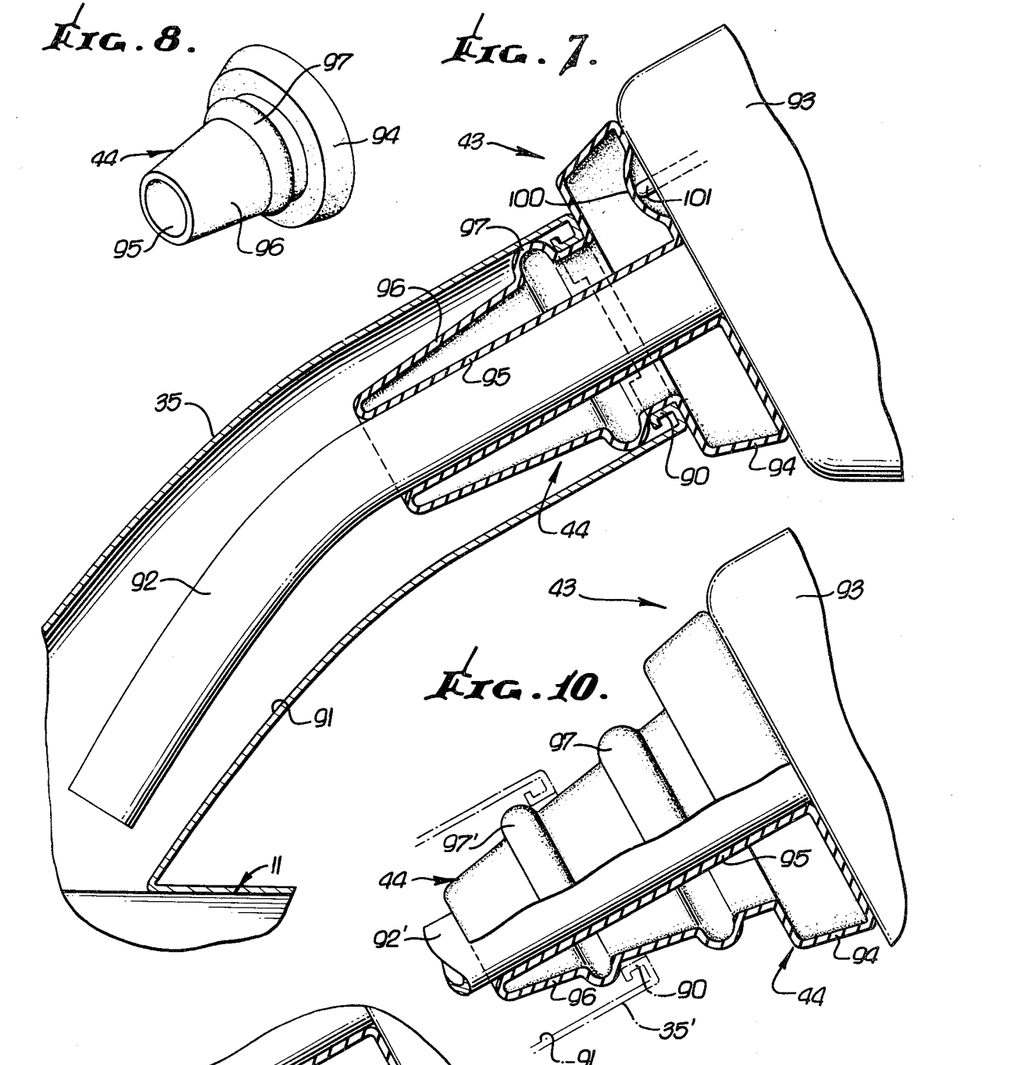
Figure 9:
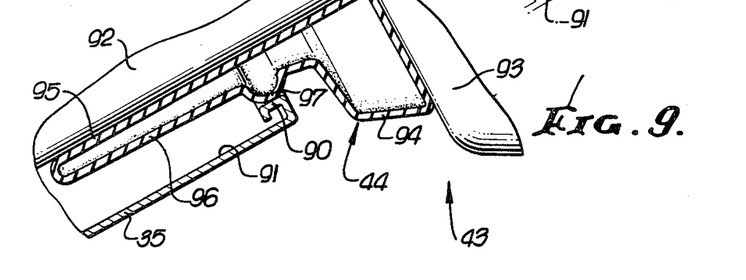
Figures 11, 12, 13:
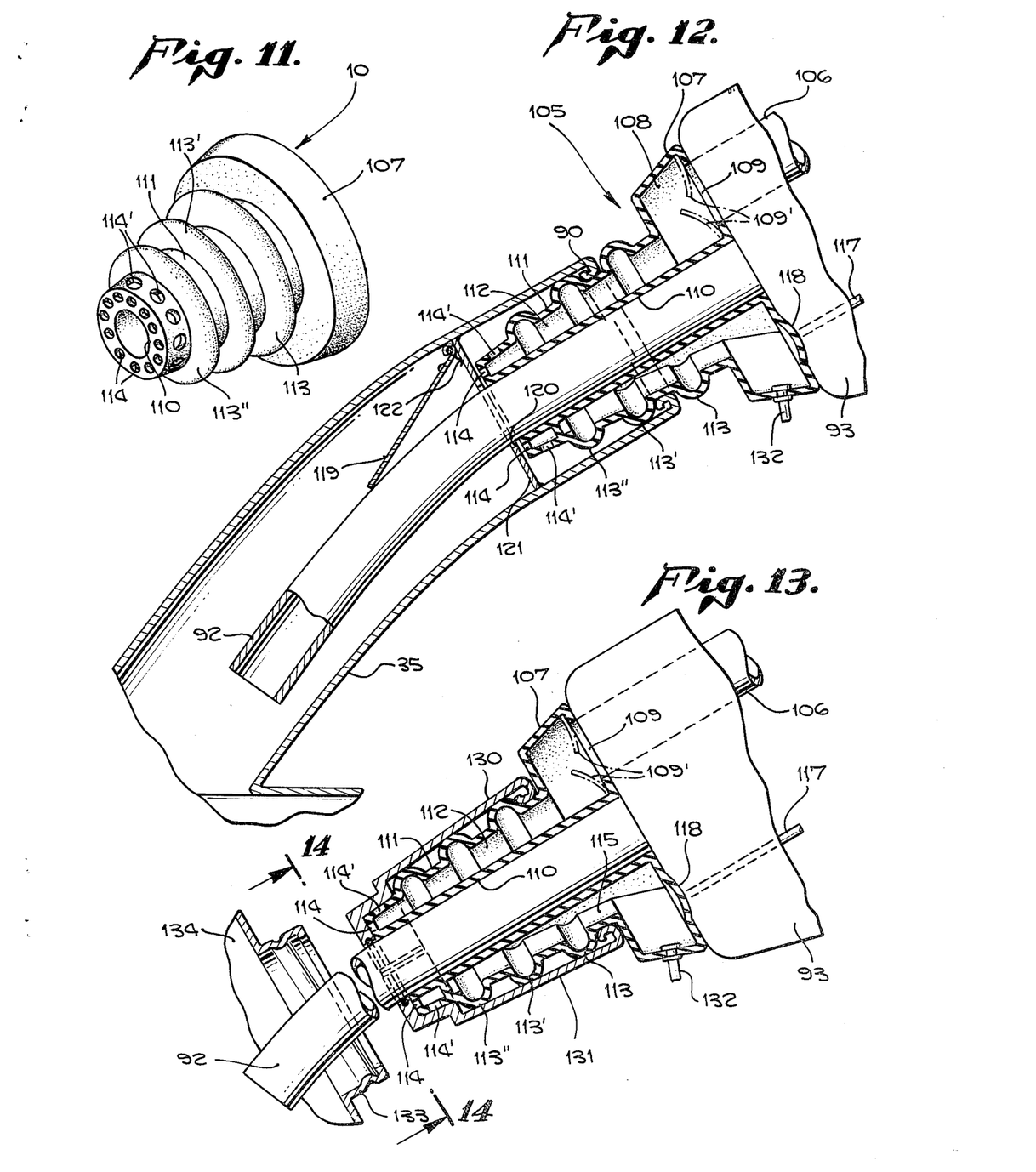

FIG. 1 is a front view of the new and novel ophthalmic device showing the new and novel one-piece preformed detachable nosepiece positioned between the pair of lens mounts;

FIG. 2 is a view, taken along line 2—2 of FIG. 1, showing the mounting tab for the one-piece preformed detachable nosepiece;

FIG. 3 is a sectional view, taken along line 3—3 of FIG. 1, showing the one-piece preformed detachable nosepiece positioned and locked to the mounting tab and positioned on the nose of the user of the device;

FIG. 4 is a front view, taken along line 4—4 of FIG. 3, showing the detachable nosepiece and the pair of rearwardly and outwardly extending projections formed on the box shaped forward portion;

FIG. 5 is a sectional view, taken along line 5—5 of FIG. 3, showing the locking means in the form of a male-female fastener locking the one-piece preformed detachable nosepiece to the mounting tab;

FIG. 6 is a side view, taken along line 6—6 and FIG. 7 is a side view taken along line 7—7, both of FIG. 5, showing the ends of the male-female fastener shown in FIG. 5;

FIG. 8 is a side view, taken along line 8—8 of FIG. 4, showing the rearwardly and outwardly extending projections on the box shaped forward portion of the one-piece nosepiece and showing also the vertical elongated slot formed in the forward portion of the nosepiece;

FIG. 9 is a top view, taken along line 9—9 of FIG. 4, showing the shape of the generally concave surface formed between the projections and also showing the friction increasing means on the concave surface to prevent slipping of the nosepiece on the nose of the user and to provide a soft cushioned surface for greater comfort to the user;

FIG. 10 is a bottom view, taken along line 10—10 of FIG. 4, showing the bottom of the concave surface and also showing the friction increasing means as before mentioned;

FIG. 11 is a rear view, taken along line 11—11 of FIG. 8, showing the complete concave surface formed between the rearwardly and outwardly extending projections on the one-piece preformed nosepiece and also showing the friction increasing means applied across the entire concave surface; and FIG. 12 is a sectional view, taken along line 5—5 of FIG. 3, showing a modification of the preferred embodiment as shown in FIG. 5 of the drawings.

DESCRIPTION OF THE PREFERRED EMBODIMENT

Referring now to FIGS. 1 and 2 of the drawing and especially to FIG. 1 there is shown the new and novel ophthalmic device generally by the numeral 10 which comprises a pair of lens mounts 12 and 14 having formed thereon facing mounting tabs 16 and 18 which are designed to receive the new and novel one-piece preformed detachable nosepiece 20 between the mounting tab 16 and 18 and being held in place by means of locking means in the form of a mating male-female fastener as will be described more fully hereinafter.

The mounting tab 16 and 18 have formed in them facing holes 22 and 24 as shown in FIG. 2 and also FIG. 5 of the drawing. The ophthalmic device also has a bridge 26 spanning the lens mounts 12 and 14 and attached thereto by means well known in the art. A pair of temples 28 and 30 are hingedly attached to the lens mounts 12 and 14 at the sides thereof by means also well known in the art.

Referring now to FIGS. 3-5 of the drawing there is shown in more detail the new and novel one-piece preformed detachable nosepiece 20 which comprises a generally box shaped forward portion 32 having formed thereupon a pair of opposed side surfaces 34 and 36 for positioning between the opposing mounting tabs 16 and 18 as shown in FIG. 1 of the drawing.

The box shaped forward portion 32 has formed thereupon a front surface 38 and a rear surface 40, and also has formed therein and between the opposed side surfaces 34 and 36, a vertical elongated slot 42 extending from one opposed side surface 34 to the other opposed side surface 36. The vertical elongated slot 42 is designed to receive the locking means comprising in the preferred embodiment of the invention, a removable male-female fastener in the form of a mating male bolt 44 and a female receptacle 46. The male bolt 44 and the female receptacle 46 both have formed thereon on the outer side thereof, a head 48 with an elongated screwdriver groove 50 for tightening the two mating parts together to form a locking fit of the nosepiece 20 between the mounting tabs 16 and 18 on the ophthalmic device 10. The opposed side surfaces 34 and 36 of the generally box shaped forward portion 32 may be abraded as shown in FIG. 8 of the drawing by the ment with the walls of the chamber. If need be, the bag may be artificially inflated the first time in order to press it effectively against the chamber walls as shown in FIG. 2.

Thereafter when the tank is to be filled, a pressure responsive automatic nozzle 43 preferably of the type shown in FIGS. 6–10 is applied to the fill pipe 35 in the usual fashion. The nozzle 43 includes a resilient muff 44. In order to prevent any vapors from passing outwardly from the fill pipe 35 around the nozzle, it is preferable to equip the nozzle with a sealing muff indicated generally by the character 44 (FIGS. 8–10) adapted to engage and seal itself around the edge of the fill pipe. As volatile liquid fuel is passed into the chamber 18 in this fashion, the liquid fuel will press upwardly against the bottom wall 16 of the bag 10 callapsing the bag and expelling air from the interior space within the bag outwardly past the valve seat 32 and breather valve passage 40 into the surrounding atmosphere.

Since only air from the surrounding atmosphere was initially present in the bag, only air will be expelled and no vapors from the tank otherwise can pass to the atmosphere. Filling can continue until the wear pad 38 engages the valve element 31, thereby to press the valve element against the valve seat 32 and effectively shut off the air passage 40, excpet for a limited access thereto through the expansion bleed holes 33. Use of the bleed holes allows air to be exhausted from the bag subsequently as liquid in the tank may expand as a result of thermal rise.

A relief pipe 42 (FIGS. 2 and 3) is shown temporarily closed with a plug 41. That part of the system directed to control of hot-soak evaporative emissions shown in FIG. 6 as adapted to be attached to the pipe 42.

As fuel is drawn from the full fuel tank 11 through the feed port 36 and the fuel line 37, for example, to operate an appropriate combustion engine, the level of fuel in the tank 11 gradually lowers. As it lowers, the wear pad 38 moves downwardly permitting the valve element 31 to disenage from the valve seat 32 and air from the surrounding atmosphere will progressively fill the interior of the flexible bag 10 to replace liquid fuel taken from the tank during use.

On those occasions where the principle of construction can be built into a new fuel tank 50, a structure such as that illustrated in FIG. 5 may be employed. In this instance an upper portion 51 of the fuel tank 50 is provided with a perimetrical flange 52 which is complementary to and matches a perimetrical flange 53 on a lower portion 54 of the tank 50. In this arrangement, a flexible diaphragm 56 is provided with a perimetrical flange 57 adapted to be clamped between the flanges 52 and 53 when the tank is initially assembled. The surface area of the diaphragm 56 is made sufficiently great so that when the tank is empty as pictured in FIG. 5, the diaphragm will assume the solid line position there shown contacting bottom and side walls of the tank. Conversely, when the tank is filled, the diaphragm will elevate to the broken line position 56', in which position a wear pad 58 will contact the breather valve assembly 21 in the same manner as previously described.

Inasmuch as the system herein above described is essentially a closed system the relief also is a closed system. In the embodiment of the invention shown in FIG. 6, there is provided a relief line 60 extending from the relief pipe 42 in which is a T 61, one leg of which is connected to a conventional spring loaded low pressure ball check valve 62, the relief line 63 wherefrom leading to the engine crank case. In the alternative it may be passed to the air supply for the combustion engine.

In the form of the device illustrated in FIG. 6 the other leg of the T is connected by a line 64 to a fuel-air intake pipe 65 of the combustion engine.

The fuel intake pipe 65 of FIG. 6 feeds a conventional intake manifold 69. A collar 70 on the intake pipe 65 has a passage 71 therethrough in which a butterfly valve element 72 is mounted on a pivot 73. The valve element 72 has a circumferentially mounted seal ring 74. The line 64 previously described has its outlet opening 75 located more or less centrally of the passage 71 and down-stream of the valve element 72.

To operate the valve element 72 an arm 76 on the valve element has a pivot connection 77 to a plunger 78 of a solenoid 79. A bracket 80 holds the solenoid 79 in position on the collar 70.

The parts described can readily retrofit most conventional combustion engine fuel systems.

It is also of some moment to note that the axis of the passage 71 is in the direction of air flow and produces a pressure drop equivalent to 0.8q (dynamic impact pressure) maximum q at the center line or axis of the air column. Accordingly, operation of the solenoid when the engine stops to close the valve element 72 will cause return of what are commonly called hot-soak vapors to the fuel tank to be condensed by the cooler reservoir of liquid fuel instead of escaping to polute the atmosphere, the vapors later going back to the engine.

As a further safeguard an O ring valve seat 85 is provided at the pipe 42. Operating against the valve seat 85 is a reinforced preformed concave disc 86 in the bag 10 acting as a valve element. The valve thus provided serves as a flapper valve when the bag 10 is fully inflated to ambient pressure. The parts described provide for a static vent to the crank case for lubricating oil absorption and prevent an excessive dynamic pressure drop from collapsing the tank under circumstances where the valve 72 may malfunction.

From the foregoing description it will be apparent that virtually any fuel systems already in existence can readily be supplied with the bag structure by the mere expedient of making use of an opening of suitable size in the top or appropriate wall structure of the tank, the size merely being big enough so that the flexible bag can be passed into the tank, inasmuch as other structure incorporated in the breather valve assembly is located on the exterior of the tank. Conventional sheet metal tanks can be readily provided with such an appropriate opening without need for removal from the vehicle itself.

Details of a nozzle 43 and muff 44 of resilient character previously made reference to are shown in FIGS. 7, 8, 9, and 10. As there shown, the fill pipe 35 is provided with a customary gas cap lock flange 90 which provides access to a passage 91. A spout 92 projecting from a body 93 of the nozzle is adapted to inject liquid fuel into the passage 91 of the fill pipe 35. The muff 44 is of hollow construction also provided with a collar 94 surrounding the base of the spout 92, the collar being of diameter large enough to overlie the entire rim of the gas cap lock flange 90. An inner sleeve 95 extending from the collar snuggly surrounds the spout 92 in sealed relationship. An outer sleeve 96 is somewhat frustoconical in shape and is spaced from the inner sleeve 95. The outer sleeve 96 is provided with a hollow bead 97 of diameter large enough to seal against the wall of the passage 91 and to releasably lock beneath the gas cap lock flange in the manner shown in FIG. 7. When applied as there shown, the entrance of the fill pipe 35 is completely sealed during the filling operation thereby confining all volatile gases which may be generated during a filling operation to the fuel tank. When such a muff construction is employed on the nozzle, it becomes a component part of a system for the control of fuel tank vapors, in combination with the bag accessory for the tank hereinabove described.

To accommodate fill pipes 35 of varying sizes the spout 92' as shown in FIG. 10 may be provided with an additional bead 97' of different circumferential size, in case a fill pipe 35', for example, may be smaller. Additional beads like the bead 97' may be employed.

Since the fill pipe 91 is sealed by action of one or another of the beads 97, 97' the resilient muff 44 may be provided with a flexible dimple 100 in operative engagement with a trigger 101. When the tank 11 is sealed by pushing the muff into place pressure created inside the muff extends the dimple 100 and shifts the trigger 101 to a position to effect release of the flow valve trigger existent in conventional dispensing nozzle (not shown) to start the flow of fuel into the tank. By this device filling can not commence until the fill pipe has been sealed thereby to assure that no vapors can escape into the atmosphere.

In the embodiment of FIGS. 11 through 16 there is shown a retrofit muff indicated generally by the reference character 105 which, in this embodiment is adapted to cooperate with a vapor return tube 106 shown as extending through the body 93 of a conventional nozzle. The vapor return tube may be a tubular means communicating between the nozzle and the upper portion of the supply reservoir for example, in a service station or the top of the reservoir in a tank truck as the case may be. The object is to return the raw hydrocarbon vapors existing in the fuel tank, or possibly in the fuel supply reservoir itself, when the tank is refilled with liquid fuel, assuming no bag in the tank as in the first described form of the invention.

The muff consists as shown of a collar 107 providing a portion 108 of a vapor return passage communicating through an opening 109 with the vapor return tube 106. Resilient flaps 109' modify flow of vapor act as a typical excess flow type liquid rejection valve to prevent liquid from flowing through the opening. A substantially cylindrical inside wall 110 is spaced from a somewhat tapered outside wall 111 to form an elongated annular pocket 112 which is also a portion of the vapor return passage. The walls are resilient, the inside wall 110 being adapted to snuggly receive the spout 92 of the nozzle. Surrounding the outside wall which is frusto conical in shape are resilient beads 113, 113' and 113" of successively varying size. The different sizes are adapted accommodate fill pipes of different diameters when one or another of the beads is expanded inside of the fill pipe 35, for example, of the tank. When the nozzle and muff are inserted inside of the fill pipe one or another of the beads 113, 113' or 113" compresses a distance sufficient to admit the muff into the neck of the fill pipe 35 and thereafter expand to seal the nozzle in position beneath the gas cap lock flange 90, after which the bead expands and releasably holds the nozzle in fill position.

A series of end openings 114 and side openings 114' at the inside end of the pocket 112 and surrounding the spout 92 admit return vapors to the pocket 112 from which they pass to the interior of the collar namely the portion 108 of the vapor return passage, ultimately to reach the vapor return tube 106.

To make certain that the nozzle is not capable of being operated to fill the tank until the nozzle and muff are fully inserted in the fill pipe, the muff is additionally provided with a closed resilient sack 115. The sack 115 is actually formed by portions of the inside wall 110 and outside wall 111 wherein a partition or barrier 116, 116' separates the sack 115 from the pocket 112, and also from the portion 108 of the collar 107 (See FIGS. 19 and 20).

A trigger 117, like the trigger 101 previously described, and of relatively conventional design, is adapted, by means not shown, to be attached to the nozzle in a manner such that when the trigger is normally extended the nozzle cannot be turned on. The trigger is adapted to be pressed into a dimple 118, normally extending into the sack 115. When the muff is pushed into the fill pipe 35 the outside wall 111 of the muff is depressed in the area of the sack 115, compressing the walls of the sack and the air trapped in the sack then shifts to extend the dimple 118 in a direction shifting the trigger 117 outwardly to a position permitting the nozzle to be operated. It is advantageous in this form of the device to have the sack 115 and trigger 117 on the low side of the nozzle leaving the vapor return passage means, and particularly the opening 109 on the higher side.

It is also of some significance to have the volume of the vapor return passage, identified in part as the pocket 112 and corresponding portion 108, equal to form about $\frac{3}{4}$ to about $\frac{7}{8}$ of the available volume of the interior in order to be certain to pass enough of the return hydrocarbon vapors. This means that the volume of the closed resilient sack 115 will be the remainder namely, from about $\frac{1}{4}$ to about $\frac{1}{8}$.

To keep the fill pipe normally closed there is a spring closed valve disc 119 which closes over an opening 120 in a partition 121 by action of a torsion spring 122.

By providing a muff of the kind described there is positive assurance that whenever the tank of an automobile for example is to be supplied with liquid hydrocarbon fuel either filling or only partially filling the tank no raw hydrocarbon vapors can escape into the atmosphere because the filling operation can not proceed until the muff is sealed in the fill pipe and at that time all of the escaping vapors are passed directly back to the source serving to displace the liquid in the source reservoir from which liquid fuel is delivered into the tank. The specific embodiment of the invention has been directed to the tank which normally is carried by an automobile or truck. The same principal however is applicable to large nozzles carried by tank trucks when the reservoir underground that the service station is to be refilled from the reservoir on the tank truck as well as in other installations where a similar transfer of hydrocarbon fuel, or in fact most any flowing material takes place. Dust laden air and grain are examples of other flowing material.

Figures 14, 15, 16:
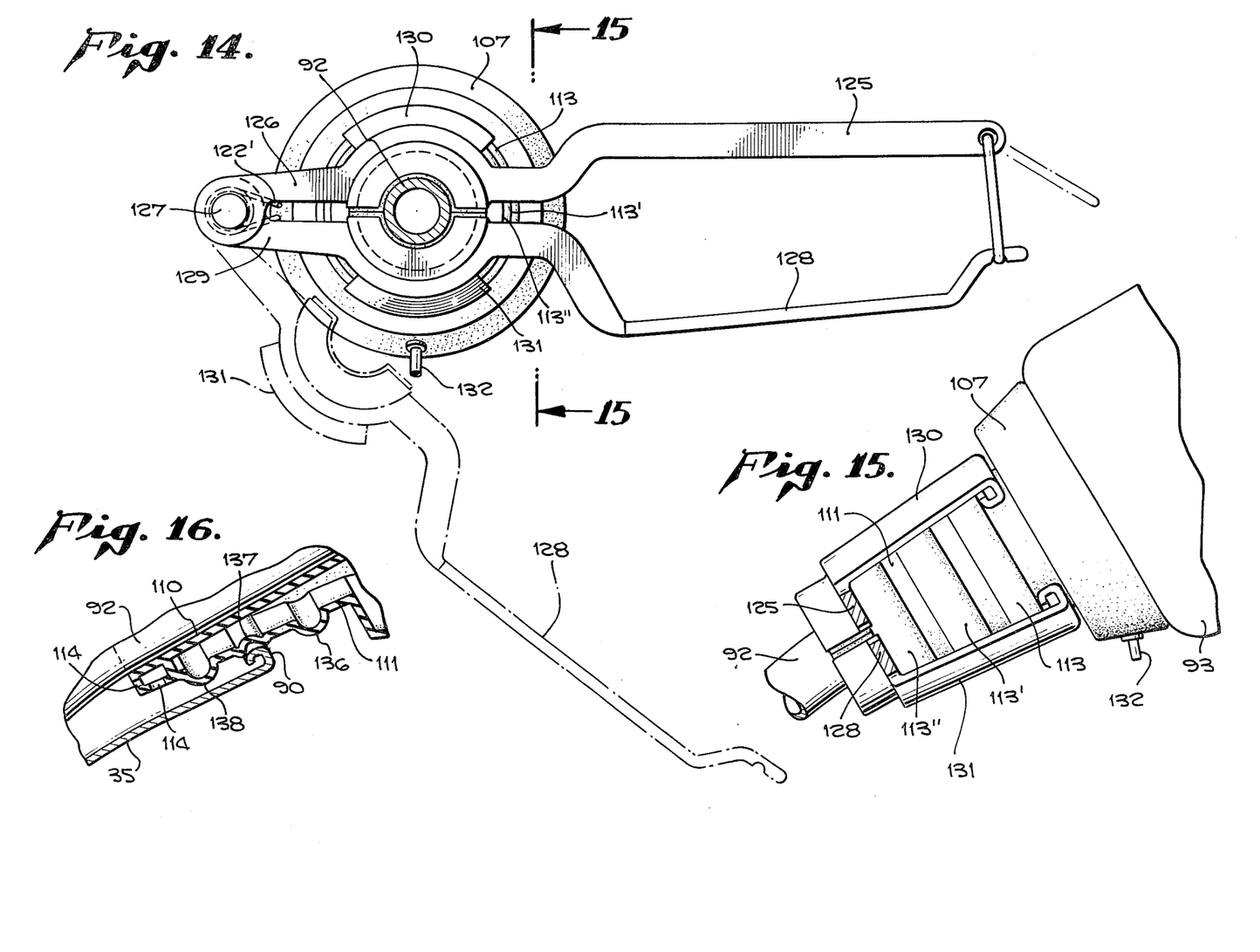

For those occasions where a fuel tank may be of some construction inhibiting the normal use of the muff in the manner herein described, there is provided a manual release embodied in a yoke arm 125 pivoted on a bracket 126 by means of a pivot pin 127 and adapted to be manipulated by a handle 128, for a bracket 129, details of which are shown in FIGS. 13, 14, and 15. A pressure portion 130 of the bracket 126 overlies one side of the muff 105 and the pressure portion 131 of the bracket 129 encompasses the resilient sack 115. By pressing together the yoke arm 125 and the handle 128 the bracket 131 is squeezed against the wall of the sack 115 compressing the resilient sack 115 sufficient to extend the dimple 118 setting off the trigger 117 thereby to start operation of the nozzle. Upon release of the handle, and by use for example of the torsion spring 122 pressure portions are adapted to be moved to a position clear of a fill pipe 133 of a can 134 so that the trigger can be operated to start the flow of fuel. A relief valve 132 may be provided to prevent damage from excess pressure.

In the embodiment of FIGS. 17 through 20 a muff 105' has an outside wall 111' made relatively stiff by employment of a laminating mesh 135. Beads 136, 137, and 138 are not reinforced by the mesh and instead are made resilient. In this embodiment depression of the resilient beads as shown in FIG. 16 allows for insertion of the nozzle and subsequent expansion provides for retention of the filler nozzle and muff in the fill pipe and by expansion to keep it there. Depression of the beads in the area of the sack 115 also serves to trip the trigger 117.

In the embodiment of FIGS. 21 through 24 a retrofit muff 140 consists of an inside wall 141 and a flexible outside wall 142 forming an annular pocket 143 between them. An annular collar 144 of flexible material provides a space 145 in communication with the pocket 143 and has a vapor return opening 146. Inflow openings 114 and 114' admit vapor to the pocket 143.

An annular resilient sealing bead 147 has a substantially closed interior envelope 148 subject to inflation through a passage 149 which communicates with the interior of the fill nozzle 92. A flap valve 150 is inserted in the nozzle 92 downstream relative to the passage 149 thereby to instigate a slight back-pressure in the passageway 149 when the trigger 117 is triggered, turning on the flow of fuel through the nozzle 92, sufficient to create the needed seal of the bead with the interior of the fill pipe 35. The trigger 117 is tripped by merely pushing against the adjacent wall of the collar 144 against the outer end of the fill pipe 35 until it collapses and pressure is physically applied to the trigger.

Constructed in this fashion a muff with a single bead may be operated successfully with virtually all sizes of fill pipes. The resilient character of the walls 141 and 142 of the muff permits it to be either retrofit or affixed to the spout 92 and removed and replaced as needed. Some replacement is inherent also in the muff of FIGS. 11 through 18. A replaceable wear resistant sock 151 may be applied over the end of the outside wall 142 to minimize the need for replacement of the entire muff because of constant wear.

Figures 17, 18, 19, 20, 25, 26:
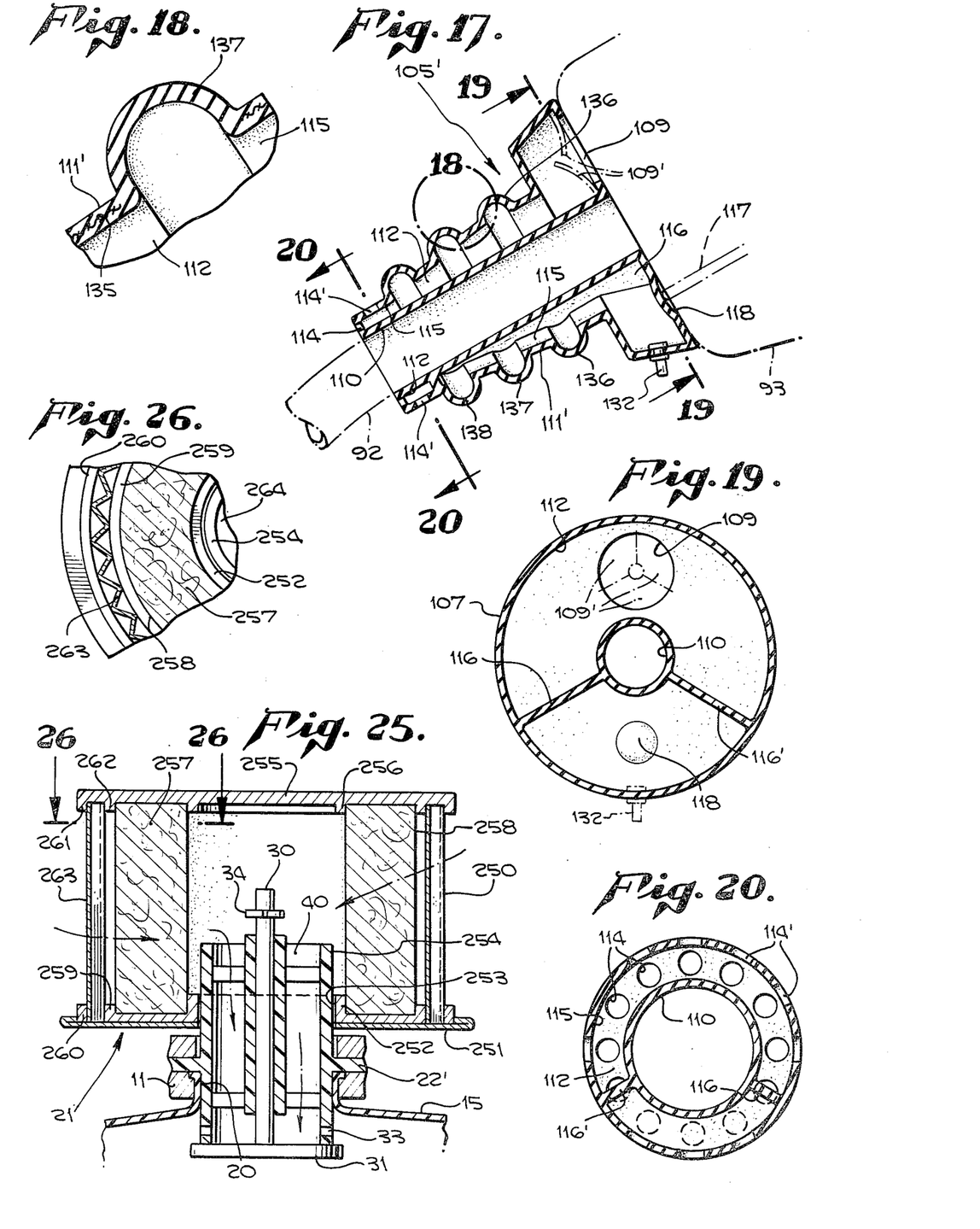
Figures 21, 22:
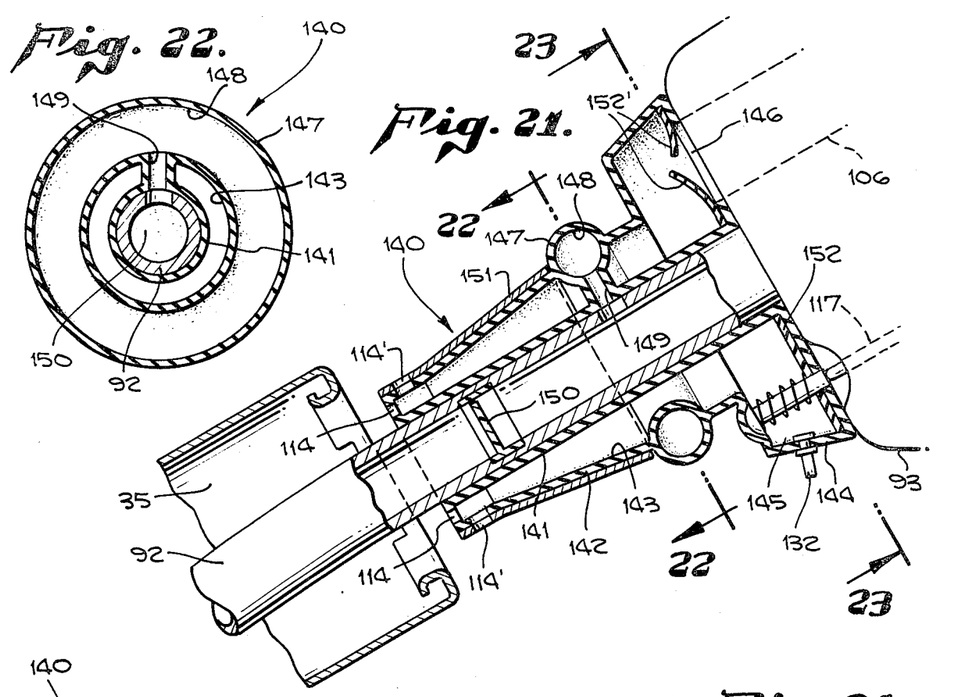
Figures 23, 24:
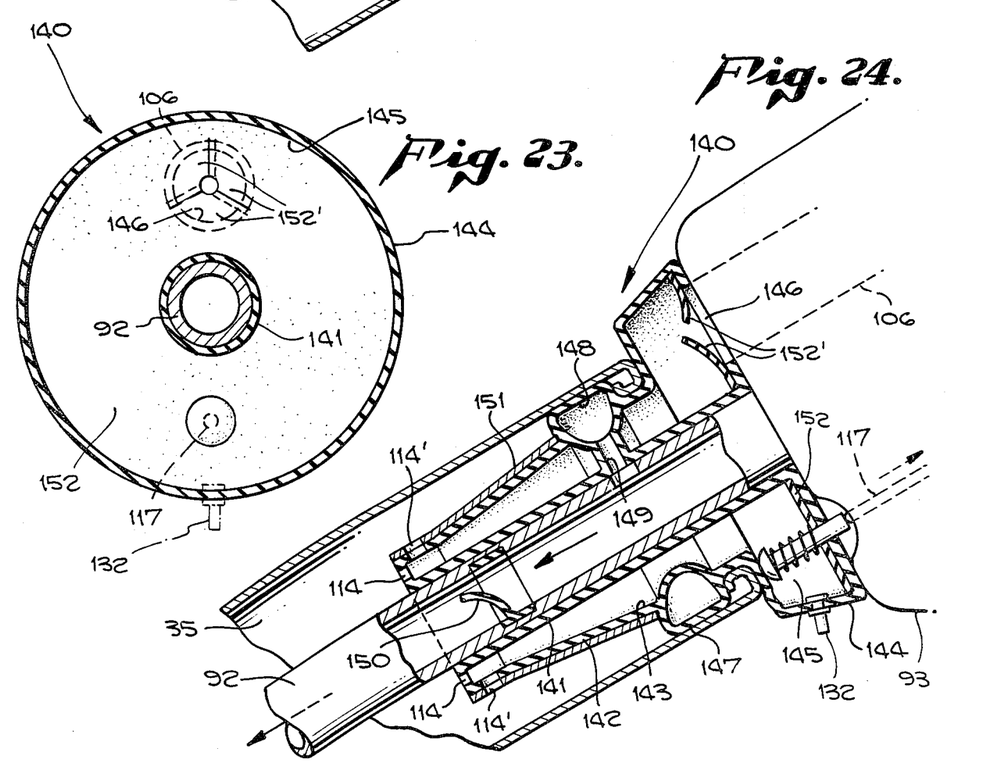

In the form of device of FIGS. 25 and 26 the breather valve assembly 21 is provided with means for treating ambient air which is drawn into the bag 15 as liquid fuel is consumed as the level in the tank 11 lowers. A jacket 250 has a bottom wall 251 and a flange 252 providing an opening 253 which fits around a cylindrical body 254 of the valve assembly 21.

On the lower side of a cover 255 is a flange 256 concentric with the flange 252. For containing a mass of moisture absorbing material 257, such for example as silica gel crystals there is an annular capsule 258 of perforate material located between the cover 255 and bottom wall 251 and positioned by the flanges 252 and 256.

Another pair of annular flanges 259 and 260 on the bottom wall with complementary flanges 261 and 262 on the cover serve to position and contain a pleated paper air filter 263. The air filter 263 and capsul 258 by reason of their location in a passageway 264 through the jacket act to filter and dry the ambient air drawn into the bag 15.

Having described the invention what is claimed as new in support of Letters Patent is as follows:

1. In a fuel tank system for receiving volatile fuel from a reservoir and for storing and dispensing said fuel to a tank for a combustion engine wherein the tank has walls forming a closed chamber, there being fuel conducting means from the reservoir, a discharge means for said chamber and a fill pipe on said tank having an inflow opening, and automatic nozzle means having a body in communication with the fuel conducting means, a spout extending from said body and an on-off trigger on said body normally biased to off position, a dispensing system including a combined fill mechanism and vapor return means in communication between the fuel conducting means and the tank, said dispensing system comprising a resilient annular muff adapted to seal within said fill pipe during a filling operation,
    said muff comprising a vapor return passage having and inlet open to the interior of the fill pipe and an outlet open toward the reservoir,
    said muff including flexible exterior and interior wall portions forming a resilient pocket, the exterior wall portion being compressible and adapted for temporary sealing engagement with the fill pipe, the interior portion being adapted to have a sealed engagement around said spout, said pocket comprising a portion of said vapor return means,
    and a resilient trigger actuator in operating engagement with the trigger, said trigger actuator being mounted on a movable portion of said muff, said trigger actuator being responsive to movement of said movable portion of the muff upon engagement of the muff with the fill pipe when the muff is pushed into sealing position whereby to shift the resilient trigger actuator to on position.

2. A fuel system as in claim 1 wherein said exterior wall portion comprises an annular resilient sealing bead having an expanded size greater than the smallest interior size of the fill tank adjacent said inflow opening therefor.

3. A muff for use with a fuel tank fill nozzle means having a spout subject to flow of fuel under pressure and having inlet and outlet ends, and a fill pipe for the tank having an inflow opening for reception of said nozzle means,
    said muff comprising resilient outside and inside wall portions forming a pocket, said inside wall portion being adapted to surround and engage the exterior of the spout in sealed relationship and said outside wall portion being adapted to resiliently engage the interior of the fill pipe,
    said pocket comprising vapor return passage means through said muff including an inlet open to the interior of the fill pipe and an outlet opening toward the inlet end of the nozzle means,
    at least a portion of said pocket being annular, and an annular hollow resilient sealing bead on the outside wall portion having an outer annular portion adapted to extend outwardly of said outside wall for sealing engagement with said fill pipe, means forming a line of communication between the interior of said bead and the interior of said spout intermediate said inlet and outlet ends of the spout whereby said sealing bead is responsive to pressure of fuel within said spout.

4. A muff as in claim 3 wherein at least a portion of said pocket is annular and there is an annular resilient sealing bead around the exterior of the outside wall portion normally larger than the interior of the fill pipe.

5. A muff as in claim 3 wherein there is back pressure means in said spout downstream of said line of communication whereby to initially create pressure in said sealing bead.

6. A muff as in claim 3 wherein there is a flexible wear inhibiting sock surrounding the muff and extending between said bead and the free end of said muff.

7. A muff as in claim 3 wherein there is a pressure relief valve in communication between said pocket and the exterior of said muff.

8. A muff for use with a fuel tank fill nozzle means having a spout subject to flow of fuel under pressure and having inlet and outlet ends, and a fill pipe for the tank having an inflow opening for reception of said nozzle means, said muff comprising resilient outside and inside wall portions forming a pocket, said inside wall portion being adapted to surround and engage the exterior of the spout in sealed relationship and said outside wall portion being adapted to resiliently engage the interior of the fill pipe, said pocket comprising vapor return passage means through said muff including an inlet open to the interior of the fill pipe and an outlet opening toward the inlet end of the nozzle means, at least a portion of said pocket being annular, and an annular hollow resilient sealing bead on the outside wall portion having an outer annular portion adapted to extend outwardly of said outside wall for sealing engagement with said fill pipe, means forming a line of communication between the interior of said bead and the interior of said spout intermediate said inlet and outlet ends of the spout whereby said sealing bead is responsive to pressure of fuel within said spout, a fuel release trigger extending between said muff and said nozzle means wherein said muff has an annular hollow flexible collar adjacent and in engagement with said trigger, said collar being collapsible by force of insertion of the muff into the fill pipe whereby said trigger is actuated.

* * * * *